United States Patent [19]

Walulik et al.

[11] 4,127,484
[45] Nov. 28, 1978

[54] FILTER RELIEF VALVE ASSEMBLY

[75] Inventors: Albert B. Walulik, Cranford; John G. Charney, Colonia; Donald A. Turk, Sewaren; Raymond D. Lewandowski, New Providence; Charles G. Pickett, North Plainfield, all of N.J.

[73] Assignee: Purolator, Inc., Rahway, N.J.

[21] Appl. No.: 831,871

[22] Filed: Sep. 9, 1977

[51] Int. Cl.² ............................................. B01D 27/10
[52] U.S. Cl. ..................................... 210/130; 210/168; 210/440
[58] Field of Search .................... 137/852, 859, 860; 210/117, 130, 168, 437, 440

[56] References Cited

U.S. PATENT DOCUMENTS

| | | |
|---|---|---|
| 3,231,089 | 1/1966 | Thornton ............................. 210/130 |
| 3,774,764 | 11/1973 | Baldwin ............................. 210/130 |
| 3,785,491 | 1/1974 | Dudinec et al. ..................... 210/130 |

Primary Examiner—Frank A. Spear, Jr.
Assistant Examiner—Richard W. Burks
Attorney, Agent, or Firm—Staas & Halsey

[57] ABSTRACT

A filter relief valve assembly for a simple, easy to assemble use with filter structures of the common oil filter throw away type which will function to permit oil by-pass of the filter element whenever the fluid pressure exceeds a predetermined value. The assembly unit is complete unto itself, but when assembled with the other filter components support and center one end of the filter element and also center and align an associated check valve in cooperation with the filter end closure.

24 Claims, 5 Drawing Figures

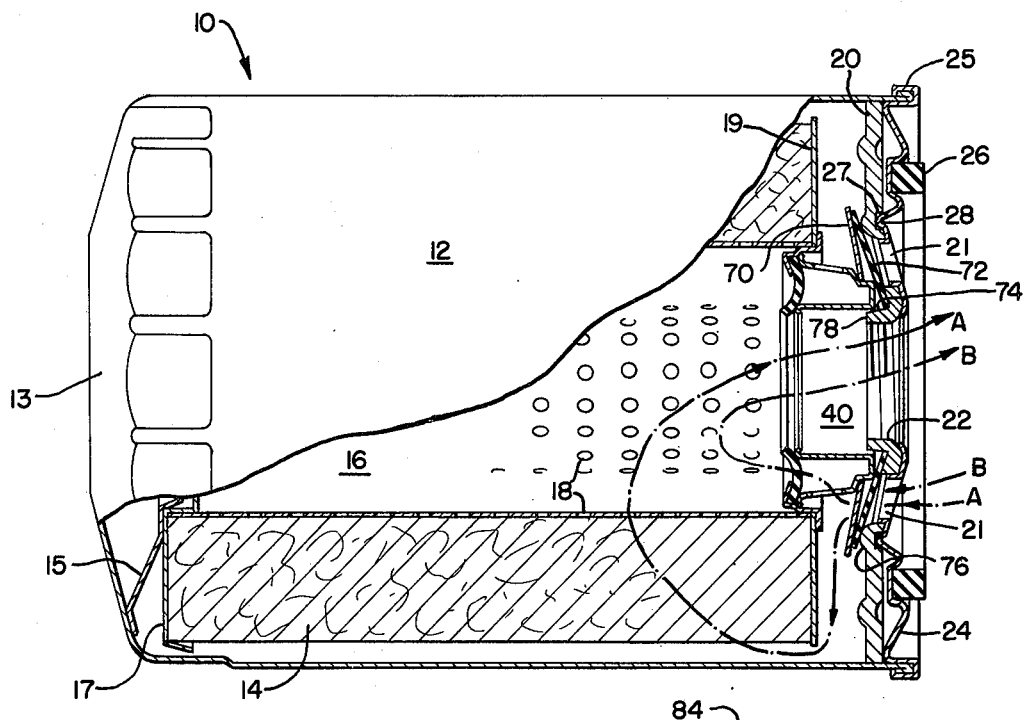
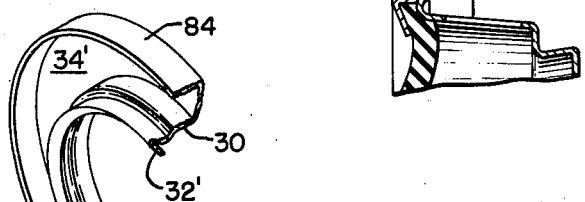
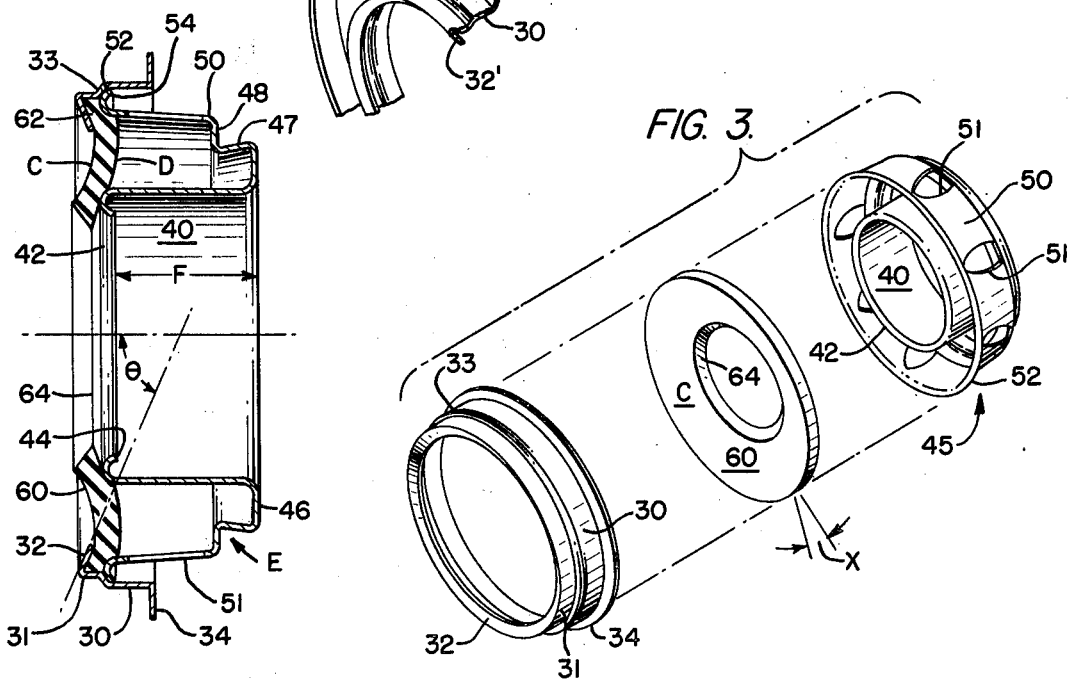

4,127,484

FILTER RELIEF VALVE ASSEMBLY

BACKGROUND OF THE INVENTION

1. Field of the Invention

This invention relates generally to filter relief valves and especially to a unit assembly type device which may be used with various types of filters of conventional throw-away type.

2. Description of the Prior Art

A common problem with known type relief valve assemblies for use with filter elements and especially of the throw-away type is that the relief valve assembly are unduly complicated, require close assembly tolerances, and are not easily installed on assembly lines and the like with rapidity and without precise installation equipment.

Another problem with known type devices is that they use a combination relief valve and check valve structure which increase the complexity of the assembly, and also further increase manufacturing accuracies and tolerances as well as complexity of the structure.

Another problem with known type combination relief valve and check valve assemblies is that the relief valve structure per se may not readily be used with other type structures because of the integral check valve structure.

Known prior art patents which are pertinent to the disclosed invention are the patents to Paul, U.S. Pat. Nos. 3,262,567; Humbert, Jr., 3,332,554; and Humbert, Jr., 3,529,722. The Paul patent employs pressure responsive relief and regulating valves which are in the form of annular spring discs. These spring discs are made of material of high yield strength and high hardness. And are not of flexible, resilient rubber-like material. Both of the patents to Humbert, Jr. relate to combination check valve and bypass valve structure and are not of the relatively simple, minimum element arrangement of the invention disclosed herein.

A Hathaway et al U.S. Pat. No. 3,083,832 has a combination by-pass and check valve structure employing an annular sealing member together with a metal spring element for maintaining the aforesaid sealing member in proper position against valve seat structure. Again, the structure is dual purpose with the additional complexities associated therewith. Another U.S. Pat. No. 3,166,498 to Otto, Jr., employs check valve structure and is not arranged to function as a relief valve. In fact, an entirely separate relief vavle structure is required with this device. The Thorton U.S. Pat. No. 3,321,089 again combines bypass and check valve structure into a combination device. This structure is also far more complicated with the requirement of precision assembly than that of the invention disclsoed herein. The Thorton et al U.S. Pat. No. 3,567,022 is a single operating relief valve structure, but has a number of different parts including a coil spring which greatly increases the expense and assembly problems with the use of such a device.

The patent to Bumb, U.S. Pat. No. 3,984,318, granted on Oct. 5, 1976, shows a sub-assembly for use with an oil filter wherein a Belleville spring by-pass valve is in combination with a rubber antidrainback valve. Again, this structure is far more complicated and involved than that of the applicants' invention.

None of the known prior art patents have the new and unique features of the invention set forth herewithin.

SUMMARY OF THE INVENTION

An object of the present invention is to provide a relief valve assembly which may be used in many different applications, especially for use with a fluid filter of the throw-away type.

Another object of the present invention is to provide a simple, easy to assemble relief valve unit which may be quickly and easily mounted within the center tubular portion of a filter element to function as a support for this end of the filter element as well as a relief valve to permit fluid upon reaching a predetermined pressure to bypass the filter element entirely.

A further object of the present invention is to provide a filter element relief valve sub-assembly which may be used for both supporting and aligning the filter element as well as aligning an associated check valve structure in conjunction with the end closure member for the overall filter shell.

A still further object is to provide a relief valve assembly having a specially configured gasket member in association with an angular support flange wherein the amount of fluid pressure required to open the valve may be changed by varying the shape of the gasket member, the angle of the support flange, and the material of the gasket member.

The device of this invention includes a relief valve assembly having an annular support member with an inwardly radial flange thereon and an outwardly extending radial flange thereon, together with another double tubular support member with the smaller inner tubular member having a valve seat formed at one end with the opposite end being connected by a radial flange to the outer tubular member, and the outer tubular member having a plurality of fluid passageways or apertures provided therein. The outer tubular member is also provided at the opposite end with a rolled extending flange for cooperation with the inwardly extending radial flange of the first annular support member to securely mount a resilient gasket member therebetween. The resilient gasket member is washer-like in shape and in the unassembled form is in the shape of a cone. When assembled between the two annular support structures the outer periphery of the gasket member is securely pressed between the support flanges and fastened in the assembly. Meanwhile, the inner peripheral portion of the gasket member and the adjacent area thereto, because of the unique configuration of the gasket member is resistently biased against the valve seat of the inner tubular support member. Depending upon the material from which the gasket member is formed, the amount of fluid pressure required to deflect the gasket member and enable fluid to flow through or by same may be accurately predetermined.

In one application of this relief valve assembly, it is used in combination with an oil filter cartridge of the conventional throw-away type, wherein the sub-assembly is centered within the central tubular area of the filter element and firmly engaged therewith in a fluid-tight manner. The outward radial flange of the first annular support member is used to engage with and support the paper end disc as associated with the filter element.

An inwardly recessed or deformed area on the outer tubular support member of the relief valve assembly provides a space for reception of associated structure of check valve mechanism. Such as a pressure spring ring for use with a check valve gasket, with said pressure spring ring being centrally aligned, held, and spaced by this recessed shoulder of the assembly. During overall filter manufacture, when the end enclosure portion of the filter is attached to the outer consister shell, the check valve gasket and spring assembly are simultaneously centered and aligned because of the use of this relief valve assembly unit.

Another embodiment of this invention includes the extension of the radially extending outer flange of the first support member outwardly a sufficient distance to function and replace the paper end disc as normally associated with the filter element. An upwardly extending or axially extending edge flange provides a full metal end cap for the filter element, and greatly improves the overall supporting and aligning function of the relief valve assembly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view, partly in cross section, of an oil filter having the relief valve assembly of this invention combined therewith.

FIG. 2 is a side elevational view, in cross section across the center line of the relief valve assembly per se of this invention.

FIG. 3 is an exploded perspective view of the component parts of the relief valve assembly of this invention.

FIG. 4, is a perspective view of a modification of the filter element contacting portion of the relief valve assembly of this invention.

FIG. 5 is a side elevational view, partly in cross section, of the modification of FIG. 4 of this invention.

DESCRIPTION OF THE PREFERRED EMBODIMENT

Looking at FIG. 1 of the drawings, reference numeral 10 indicates in general the throw-away type oil filter cartridge with which the relief valve assembly of this invention may be used. A cylindrical canister 12 having a closed end 13 with filter element aligning end supporting structure 15 together with end cap 17 supports one end of the filter element 14. The filter element 14 has a central tubular portion 16 provided with fluid flow apertures 18. The open end of the cylindrical canister 12 is provided with an enclosure disc 20 having fluid inlet holes 21 provided circumferentially around a central fluid outlet aperture 22. This aperture 22 is normally internally threaded for screwing the overall filter cartridge upon a complementary projecting threaded stud on an engine. Another separate plate 24 having corresponding apertures therein to those of disc 20 is normally assembled to the canister 12 by rolling the outer edges of the combined materials together as indicated at 25. Also, an engine seating gasket 26 is normally provided with this plate. Also, an alignment and retention recess 27 is provided in disc 20 for reception of the raised portion 28 on the closure plate 24.

The fluid flow lines indicated by A show the normal flow of the fluid into the inlet holes 21 and through the inside of the canister housing through the filter element 14, into the center of tube 16, and out through opening 22, back to the engine or other device with which the filter is being used. Generally, the flow lines indicated by B indicate the bypass function of this relief valve sub-assembly whenever the filter element 14 becomes sufficiently clogged to prevent pass of fluid therethrough, and/or if the fluid itself should be of such thickness and consistency as not to readily flow through the filter element. That is the relief valve will allow fluid to bypass the filter and return through opening 22 back to the engine in the same manner as already described.

Looking at FIGS. 2 and 3 of the drawings, the relief valve assembly will now be described in detail. A first tubular support member 30 is provided having a radially extending flange member 34 at one end thereof, and a reduced axially extending portion 31 extending from the other end thereof. The reduced annular portion 31 is in turn provided with an inwardly radially extending flange 32. While the outwardly extending flange 34 is at right angles or perpendicular to the center axis of tubular support member 30, the inwardly extending flange 32 is at an angle relative to the center line. This angle indicated by $\theta$ in FIG. 2, is normally between 50° to 85°, and preferably is between the range of 65° to 70°.

The second tubular support portion of the assembly is indicated by reference numeral 45 and is in the form of a tubular member 40 having a rolled end for forming a valve seat 42. The opening 44 permits maximum fluid flow through this tubular member 40. The other end of tubular member 40 is contiguous with an outwardly extending radial flange portion 46. A recessed shoulder portion is formed by connecting portions 47 and 48 and connect to the outer tubular member 50. This outer tubular portion 50 is provided with a plurality of apertures 51 for the passage of fluid therethrough. While one or two of such fluid passageways would function, the inventors have discovered that a plurality of same, preferably at least eight, function in an advantageous manner, and also without decreasing the necessary strength of the support member 40-50. The outer tubular member 50 also is provided with a rolled end 52 similar to the rolled end 42 of tubular member 40. However, the rolled end 42 which functions as a gasket valve seat, has the roll in the inward direction to form the opening 44, while the rolled end 52 on tubular member 50 is rolled outwardly to form a somewhat bendable outer edge 54. This is quite important with this device in that this outer edge 54 securely and basically permanently engages within tubular member 30 at the point where deformation and reduction of member 30 indicated by reference numeral 33 in FIG. 2 occurs. It is the complementary engagement of portions 33 and 54 which securely holds the support members 30 and 40-50 together.

Only one additional element is needed for completion of the relief valve assembly. This is the element 60 which is the gasket member for the structure. This gasket member 60 is of necessity formed of a resilient flexible material which is normally impervious to oil, gas, and other fluids of deleterious nature. The inner opening 64 is of slightly smaller diameter than the diameter of opening 44. Thus, when the outer periphery 62 of the gasket member 60 is securely retained between the radial flange member 32 and the rolled portion 52, as best seen in FIG. 2, the gasket will be securely held in proper operating position.

Another feature is in the shape of gasket 60 prior to assembly. Normally as contemplated in this invention, the gasket member 60 will have a cone shape with an angle X of approximately 30° from the face plane of the member. That is, normally the angle of the side portions on the inner and outer sides of the gasket member, shown as C and D in the figures, will be at an angle comparable to the angle θ of the inwardly directed radial flange 32. Thus, with this conical shape and angular relationship, when the outer periphery 62 is mounted, as best seen in FIG. 2, the inner portion of the side D near the opening 64 must of necessity be forced against the valve seat 42. The amount of this resilient biasing is predetermined by proper selection of the gasket material. Also, the degree of cone angle may be varied in order to vary this resilient biasing function. That is, with higher density, less flexible and resilient material, the bias force will be increased, and thereby the fluid pressure required to open the valve gasket also will be substantially increased. Furthermore, by increasing the cone angle in the direction towards making a sharper cone, likewise will increase the degree of pressure bias, and thus increase the predetermined pressure at which the valve member will open. Similarly, a change in angle θ of the flange 32 will effect a change in pressure value.

Another important feature of this invention is in the shoulder portions 47 and 48, as best seen in FIG. 2, which connect the radial flange 46 and the outer tubular member 50. This recessed shoulder, labeled E, provides support for associated check valve structure, if desired, when the unit is mounted as in FIG. 1 with a filter cartridge structure. As thus seen in FIG. 1, a metal spring member 70 is centered and aligned by means of the recessed shoulder E and in turn engages with a flexible gasket member 72 which in turn engages with the base portion 74 on the disc 20. Thus, the check valve gasket 72 will prevent unwanted return of fluid to the engine or the like through the inlet openings 21. While the outer peripheral portion of gasket 72 engages with the projection raised rib 76 of member 20, the inner annular opening of the gasket 72 is mounted on the projection 78 defining opening 22 of disc 20.

Another embodiment of this invention may be seen in FIGS. 4 and 5 wherein the outwardly radial flange 34 is substantially extended 34' for elimination of the conventional paper end disc 19 as seen in FIG. 1. The radial flange 34' is of sufficient size to completely cover the associated end portion of the filter element 14 and also provided with an axially aligned flange 84 to complete encase and support the associated end of filter element 14. Much in the manner of the full metal and cap 17 for the other end of the filter element as seen in FIG. 1. By using this modification, the paper end disc 19 may be completely eliminated, thus reducing the number of necessary elements in the disposable oil filter cartridge, and thus also decreasing the assembly and overall cost.

Normally the outer circumference of the gasket member 60 will be just slightly smaller than the internal circumference of the tubular member reduced portion 31, so that during assembly, the cone shaped gasket may be easily inserted and mounted within member 30. Then the support element 40-50 will be pressure fitted or forced into the inner circumference of tubular portion 30 to securely lock and retail the gasket member in place. With the proper amount of valve bias resulting due to; the angle of the gasket member 60, the radial flange 32, and the material from which the gasket member 60 is formed. If a desired predetermined fluid pressure is to be changed to either a lower or higher value, the production run may easily call for a substitute of gasket member 60 of different material, or different cone angle and shape, and/or the flange member 32 angle φ may be changed. Normally, the distance between the flange 46 and the rolled valve seat 42 is the same as that between flange 46 and the rolled shoulder engaging portion 52. However, by changing the relative distances and dimensions thereof, another way of changing the predetermined fluid pressure is provided. That is, by decreasing the distance F the predetermined pressure valve may be reduced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

We claim:

1. A fluid filter having a fluid-tight canister having a cylindrical filter element contained therein, said filter element having a center tube therein, a closure disc at one end of the canister having a fluid inlet and fluid outlet therethrough, the improvement comprising:

means for engagement with said filter element mountable within one end of the center tube thereof, additional means for engagement and alignment with said closure disc for permitting fluid flow through associated openings thereof, and further means associated with the aforesaid means for permitting fluid flow to bypass said filter element when pressure of said fluid exceeds a predetermined given amount, the means for engagement with said filter element including an axially extending tubular member having a radially inwardly extending flange formed with a preset angle with respect to the center line axis of said tubular member, said further means for permitting fluid flow when pressure of said fluid exceeds a predetermined amount includes a resilient conical shaped gasket member, said gasket member being mounted between the radially inwardly extending flange with preset angle of said axially extending tubular member and a second tubular member having a rolled inner end flange abutting against the gasket member on the opposite side thereof from the angled flange in order to pre-stress the conical gasket member against the pressure of fluid.

2. The structure as set forth in claim 1, wherein the value of the predetermined pressure for permitting fluid flow past the valve depends in part upon the resilient material of said gasket member of conical shape.

3. The structure set forth in claim 1, wherein the value of the predetermined pressure for permitting fluid flow past the valve depends in part by the degree of taper of the conical shaped gasket member.

4. The structure as set forth in claim 1, wherein the amount of predetermined pressure for controlling bypass fluid flow is in part determined by the angle which the inwardly radial flange on said first tubular member makes with the center line of the device and in turn, the pressure it exerts upon the conical gasket member when in assembled relationship.

5. A fluid filter having a fluid-tight canister having a cylindrical filter element contained therein, said filter element having a center tube therein, a closure disc at one end of the canister having a fluid inlet and fluid outlet therethrough, the improvement comprising:

means for engagement with said filter element mountable within one end of the center tube thereof, additional means for engagement and alignment with said closure disc for permitting fluid flow through associated openings thereof, and further means associated with the aforesaid means for permitting fluid flow to bypass said filter element when pressure of said fluid exceeds a predetermined given amount, all of the aforesaid means being combined in a simple, easy to assemble, completly unitized structure for effecting said aforesaid function;

the means for engagement with said filter element including an axially extending tubular member having a radially inwardly extending flange formed with a preset angle with respect to the center line axis of said tubular member, and further provided with an outwardly extending radial flange member substantially perpendicular to the center line of said tubular member;

said radially outwardly extending flange engaging with one end of said filter element and further extending beyond the outer circumference thereof, and being further provided with an axially extending circumferential flange so as to function as a full end cap for said filter element.

6. A fluid filter having a fluid-tight canister having a cylindrical filter element contained therein, said filter element having a center tube therein, a closure disc at one end of the canister having a fluid inlet and fluid outlet therethrough, the improvement comprising:

means for engagement with said filter element mountable within one end of the center tube thereof, additional means for engagement and alignment with said closure disc for permitting fluid flow through associated openings thereof, and further means associated with the aforesaid means for permitting fluid flow by pass said filter element when pressure of said fluid exceeds a predetermined given amount, all of the aforesaid means being combined in a single, easy to assemble, completely unitized structure for effecting said aforesaid function;

said additional means for engagement and alignment with said closure disc including a second tubular member having inner and outer axially extending portions connected together at one end of each by a radially extending connecting portion, said outer axially extending portion being provided with a recessed shoulder adjacent the connecting portion for reception and alignment of separate anti-drainback fluid means.

7. The structure as set forth in claim 6, wherein at least one of the other ends of the unconnected inner and outer portions being provided with a rolled radial flange to function as a valve seat, and the other end of the other unconnected inner and outer portions being provided with a similar rolled radial flange.

8. The structure as set forth in claim 7, wherein said outer axially extending portion of the second tubular member is provided with a plurality of fluid apertures therein.

9. A valve assembly for a fluid filter device comprising:

means for providing simple, minimum element, easy to assemble, completely independent valve structure for use with a fluid flow filter device including;

first support means for direct contact with a fluid filter element, second support means for association with fluid flow input and output means, and third means of special configuration retained between said first and second support means for permitting fluid flow through said assembly only when a given fluid pressure is reached; said third means for permitting fluid flow including a conically shaped pre-formed gasket member of resilient, flexible material which achieves a predetermined pressure of said fluid flow by means of the pre-formed degree of taper of the conical shape. and wherein said first support means includes an axially extending tubular member having a perpendicular, radially extending flange at one end of said tubular member, and an inset reduced tubular portion at the other end of said member, said inset portion being provided with an inwardly extending radial flange formed with a predetermined angle with respect to the centerline of said tubular member.

10. The structure set forth in claim 9, wherein the reduced tubular portion connected to the tubular member provides a shoulder which functions as an aid in rapid assembly of the unit within an associated filter element and also forms a sealing portion in conjunction with the fluid flow permitting means.

11. The structure set forth in claim 9, wherein the reduced tubular portion connected to the tubular member provides a shoulder which functions as an aid in rapid assembly of the unit within an associated filter element and also forms a sealing portion in conjunction with the fluid flow permitting means.

12. A valve assembly for a fluid filter device comprising:

means for providing simple, minimum element, easy to assemble, completely independent valve structure for use with a fluid flow filter device including;

first support means for direct contact with a fluid filter element, second support means for association with fluid flow input and output means, third means of special configuration retained between said first and second support means for permitting fluid flow through said assembly only when a given fluid pressure is reached, the second support means including inner and outer tubular members connected together at each of one of their respective ends, the other end of each of said tubular members being provided with a formed rolled surface thereon, one of said rolled end surface functioning as a valve seat member, and the other rolled and surface functioning in conjunction with said first support means for retaining said third means in operating position.

13. The structure set forth in claim 12, wherein said outer tubular member is provided with a reduced annular portion for association with a separate anti-flow fluid means.

14. The structure set forth in claim 12, wherein said outer tubular member is provided with a plurality of fluid apertures therein for permitting fluid flow through said outer tubular member when the device is in use.

15. The structure as set forth in claim 14, wherein at least eight fluid apertures are provided in said outer tubular member for permitting full fluid flow without substantially reducing the strength of the outer tubular member.

16. The structure as set forth in claim 15, wherein the third means for permitting fluid flow includes a conically shaped gasket member of resilient, flexible material which achieves a predetermined pressure of said fluid flow by means of the degree of taper of the conical shape.

17. The structure as set forth in claim 16, wherein the predetermined pressure value for permitting fluid flow past the valve depends in part upon the resilient, flexible material of said gasket member of conical shape.

18. A valve assembly for a fluid filter device comprising:
   means for providing simple, minimum element, easy to assemble, completely independent valve structure for use with a fluid flow filter device including;
   first support means for direct contact with a fluid filter element,
   second support means for association with fluid flow input and output means,
   and third means of special configuration retained between said first and second support means for permitting fluid flow through said assembly only when a given fluid pressure is reached,
   said first support means including an axially extending tubular member having a perpendicular radially extending flange at one end of said tubular member, and an inset reduced tubular portion at the other end of said member, said inset portion being provided with an inwardly extending radial flange formed with a predetermined angle with respect to the centerline of said tubular member,
   the third means for permitting fluid flow including a conically shaped gasket member of resilient, flexible material which achieves a predetermined pressure of said fluid flow by means of the degree of taper of the conical shape,
   the reduced tubular portion connected to the tubular member providing a shoulder which functions as an aid in rapid assembly of the unit within an associated filter element and also forms a sealing portion in conjunction with the fluid flow permitting means, and
   said outer tubular member being provided with a reduced annular portion for association with a separate anti-flow means.

19. The structure set forth in claim 18, wherein at least eight fluid apertures are provided in said outer tubular member for permitting full fluid flow without reducing the strength of the outer tubular member.

20. The structure as set forth in claim 18, wherein the amount of predetermined pressure for controlling bypass fluid flow is in part determined by the angle which the inwardly directed radial flange on said first tubular member makes with the center line of the device and in turn, the pressure it exerts upon the conical gasket member when in assembled relationship.

21. An oil filter device of the throw-away type for use with automobiles engines and the like comprising:
   a canister shell having an open end, a filter element mounted within said canister shell and supported at the closed end thereof by end cap support structure, a closure member of disc configuration enclosing said open end of said canister shell and provided with an inlet for delivering oil to said filter element and an outlet for receiving filtered oil from said filter element, and a filter relief valve sub-assembly mounted within said canister between said filter element and said closure disc, the improvement comprising said filter relief valve sub-assembly having a central tubular portion for permitting oil flow therethrough, one end of said central tubular member being provided with valve seat means, another tubular member larger than and surrounding said first tubular member for permitting oil flow therethrough and also for pressure fitting of said subassembly together as a unit, a further even larger tubular member provided with an internal shoulder for receiving one end of said another tubular member to retain a gasket member therebetween, said further tubular member also provided with an inwardly extending flange with said flange being at a predetermined angle to the center line of said sub-assembly, and a flexible gasket member retained between the one end of said another tubular member and the inwardly extending flange of the further tubular member with the predetermined angle thereof contributing to the predetermined tension on the flexible gasket member for effecting the oil flow control when a predetermined desired pressure of same is exceeded.

22. The structure set forth in claim 21 together with said further tubular member being provided with a radially extending flange for contact with the associated end of said filter cartridge.

23. The structure set forth in claim 21, wherein the predetermined pressure value for operation of said relief valve sub-assembly is controlled by the material from which the gasket is formed, the shape of said gasket material which is of special conical configuration, and the degree of angular shape thereof.

24. The structure set forth in claim 21, together with an anti-flow check valve associated with the tubular members and maintained in alignment thereby with respect to the relationship of said end closure disc for the purpose of preventing oil backflow through said inlet thereof.

* * * * *

UNITED STATES PATENT AND TRADEMARK OFFICE
CERTIFICATE OF CORRECTION

PATENT NO. : 4,127,484
DATED : November 28, 1978
INVENTOR(S) : ALBERT B. WALULIK et al It is certified that error appears in the above-identified patent and that said Letters Patent are hereby corrected as shown below:

```
Column 1, line 49, "vavle" should be --valve--;
Column 1, line 54, "disclsoed" should be --disclosed--;
Column 3, line 4, "consister" should be --canister--;
Column 4, line 21, after "85°" insert --,--;
Column 4, line 22, delete ",";
Column 5, line 46, "complete" should be --completely--;
Column 5, line 62, change "place. With" to --place with--;
Column 8, line 13, delete ".";
Column 8, line 55, "and" (second occurrance) should be
                    --end--;
Column 10, line 24, "subassembly" should be --sub-assembly--.
```

Signed and Sealed this

Seventeenth Day of April 1979

[SEAL]

Attest:

RUTH C. MASON
*Attesting Officer*

DONALD W. BANNER
*Commissioner of Patents and Trademarks*